United States Patent
Loe et al.

(10) Patent No.: US 7,726,584 B2
(45) Date of Patent: Jun. 1, 2010

(54) THERMAL VALVE ASSEMBLY

(75) Inventors: Derril A. Loe, Williamston, MI (US); Richard F. Olenzek, Farmington Hills, MI (US); Todd R. Berger, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1006 days.

(21) Appl. No.: 11/430,255

(22) Filed: May 8, 2006

(65) Prior Publication Data

US 2007/0257119 A1     Nov. 8, 2007

(51) Int. Cl.
G05D 23/02 (2006.01)
G05D 20/00 (2006.01)
F16K 21/18 (2006.01)
F16K 17/38 (2006.01)
F01B 29/10 (2006.01)

(52) U.S. Cl. .................. 236/93 R; 236/50; 137/389; 137/468; 60/527

(58) Field of Classification Search ............... 236/93 R, 236/50; 137/389, 468; 60/527
See application file for complete search history.

(56) References Cited

U.S. PATENT DOCUMENTS

| | | | |
|---|---|---|---|
| 2,043,489 A * | 6/1936 | Peo ............................. 188/309 |
| 3,053,051 A * | 9/1962 | Kelley ......................... 60/329 |
| 3,930,423 A | 1/1976 | Craig .......................... 74/732 |
| 4,075,912 A | 2/1978 | Schaefer ...................... 74/867 |
| 4,195,652 A | 4/1980 | Smith .......................... 137/43 |
| 4,217,926 A * | 8/1980 | Van Gorder ................. 137/389 |
| 6,044,645 A * | 4/2000 | Greenan et al. ............... 60/337 |
| 2005/0271523 A1 * | 12/2005 | Kawakami et al. .......... 417/269 |

* cited by examiner

Primary Examiner—Thomas E Denion
Assistant Examiner—Michael Carton
(74) Attorney, Agent, or Firm—Quinn Law Group, PLLC

(57) ABSTRACT

A thermal valve assembly for a transmission is provided. The thermal valve assembly includes a body having a base portion having a plurality of opposing sidewalls extending therefrom. A cover is mounted with respect to the body and operates to at least partially close the body to form a volume. The base portion defines an inlet orifice, while at least one of the plurality of opposing sidewalls at least partially defines an outlet orifice. A plate is operable to selectively close the inlet orifice. A bi-metallic spring member is disposed at least partially within the volume. The bi-metallic spring member is operable to bias the plate against the base portion. Additionally, the bi-metallic spring member has a variable stiffness characteristic responsive to temperature.

18 Claims, 2 Drawing Sheets

THERMAL VALVE ASSEMBLY

TECHNICAL FIELD

The present invention relates to thermal valve assemblies operable to regulate fluid level within a main sump volume of a vehicular transmission.

BACKGROUND OF THE INVENTION

Automatically shiftable transmissions require a supply of pressurized oil or fluid to operate. The pressurized fluid may be used for such functions as lubrication, torque converter operation, and engagement of torque transmitting mechanisms for gear ratio interchange. The fluid is typically stored in a main reservoir or main sump volume where it is introduced to a pickup or inlet tube for communication to a positive displacement hydraulic pump. The pump operates to pressurize the fluid for subsequent communication to the transmission. Therefore, the inlet tube must remain submerged in fluid during the operation of the transmission to avoid pump starvation. To this end, an adequate oil level is typically maintained within the main sump volume of the transmission during cold operation. However, at higher fluid temperatures, the fluid tends to expand and entrain an amount of air such that the volume of fluid within the main sump volume may increase significantly. This increase in fluid volume may interfere with moving parts within the transmission, such as a drive link assembly, causing a decrease in transmission efficiency and a possible increase in fluid aeration. An increase in fluid aeration above acceptable limits may lead to transmission malfunction. To maintain the proper fluid level within the main sump volume, an auxiliary sump volume may be employed to contain the excess volume of fluid at warm fluid temperatures and to communicate this excess volume of fluid to the main sump volume at cold fluid temperatures.

SUMMARY OF THE INVENTION

Accordingly, a thermal valve assembly for a transmission is provided having a body with a base portion and a plurality of opposing sidewalls extending therefrom. A cover is mounted with respect to the body and operates to at least partially close the body to form a volume. An inlet orifice is defined by the base portion and an outlet orifice is defined at least partially by at least one of the plurality of opposing sidewalls. A plate operates to selectively close the inlet orifice. A bi-metallic spring member is disposed at least partially within the volume and operates to bias the plate against the base portion. The bi-metallic spring member has a variable stiffness characteristic responsive to temperature. In the preferred embodiment, the thermal valve assembly is configured to be mountable within an auxiliary sump volume of the transmission.

The thermal valve assembly may further include a flange portion at least partially defined by one of the plurality of opposing sidewalls. A first pin and a second pin may extend from the flange portion and are sufficiently configured for attachment to a case of the transmission. Preferably, the first pin and the second pin are generally cylindrical in shape and the first pin is larger in diameter than the second pin. The cover may be mounted to the body by welding, adhesive bonding, snap fit, or other known mounting methods. The thermal valve assembly may further include a spring member mounted with respect to the thermal valve assembly, which cooperates with a side cover member of the transmission to retain the thermal valve assembly with respect to the transmission.

The thermal valve assembly may further include a first post member extending from the base portion and at least partially within the volume. The first post member is configured to retain the bi-metallic spring member with respect to the body; and the plate defines a slot sufficiently configured to slidingly engage the first post member. Additionally, a second post member may be provided extending from the base portion and at least partially within the volume. The second post member is spaced from the first post member. The plate defines a hole generally opposite the slot, the hole being configured to loosely receive the second post member to pivotably retain the plate. A transmission incorporating the thermal valve assembly of the present invention is also disclosed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
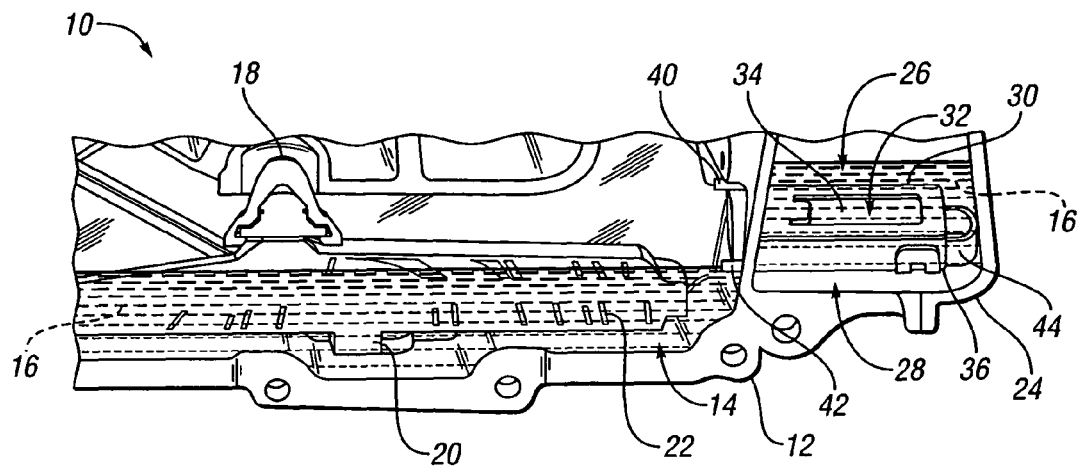
FIG. 1 is a partial cross sectional view of a vehicular transmission illustrating a thermal valve assembly and placement thereof consistent with the present invention.

Referring to the drawings wherein like reference numbers correspond to like or similar components throughout the several figures, there is shown in FIG. 1 an automatically shiftable transmission 10 having a housing or case 12. The case 12 at least partially defines a main reservoir or main sump volume 14 within which a quantity of oil or fluid 16 may be collected. Mounted with respect to the case 12 is a positive displacement hydraulic pump 18, only a portion of which is shown in FIG. 1. The pump 18 may be a fixed displacement pump or a variable displacement pump. The pump 18 operates to draw fluid 16 from the main sump volume 14 through a pickup or inlet tube 20. Prior to entering the pump 18, the fluid 16 passes through a filter 22 that removes particulate matter from the fluid 16. The fluid 16 is then pressurized by the pump 18 and communicated at a line pressure to various components within the transmission 10.

A side cover member 24 is removably mounted to the case 12 and encloses a valve body assembly, not shown. Additionally, the side cover member 24 cooperates with the case 12 to form an auxiliary sump volume 26. Those skilled in the art of transmission design will recognize that the valve body assembly may include a plurality of valves operable to control torque transmitting engagement as well as selectively provide pressurized fluid to other components within the transmission 10. Therefore, the valve body assembly will exhaust pressurized fluid to the auxiliary sump volume 26 during operation of the transmission 10.

A thermal valve assembly 28 is mounted in a generally orthogonal relation to the case 12 such that the thermal valve assembly 28 is positioned generally horizontally within the auxiliary sump volume 26. The thermal valve assembly 28 operates to selectively communicate fluid 16 from the auxiliary sump volume 26 to the main sump volume 14. The thermal valve assembly 28 includes a body 30 defining an inlet orifice 32. A plate 34 selectively blocks the inlet orifice 32 and a cover 36 closes the body 30. The plate 34 may be formed from stainless steel or other suitable material that possesses the requisite stiffness to avoid deflection and the necessary chemical resistance to the fluid 16. Additionally, the body 30 and the cover 36 are preferably formed or molded from a thermoplastic polyamide, such as nylon. However, those skilled in the art will recognize that the body 30 and cover 36 may be formed from other materials that provide the requisite material qualities, such as structural strength, chemical resistance, and resistance to heat. The construction of the thermal valve assembly 28 will be discussed in greater detail hereinbelow with reference to FIGS. 2 through 4.

When the transmission 10 is operating, the fluid 16 is exhausted or leaked from the valve body assembly into the auxiliary sump volume 26. If the temperature of the fluid 16 is low, the weight of the column of fluid 16 above the thermal valve assembly 28 will bias the plate 34 against a thermally responsive bi-metallic spring member 38, shown in FIGS. 3 and 4, thereby opening the inlet orifice 32. The open inlet orifice 32 will allow fluid 16 contained within the auxiliary sump volume 26 to flow to the main sump volume 14. As the temperature of the fluid 16 increases, the bias force of the bi-metallic spring member 38 increases. Therefore, a higher level of fluid 16 is required within the auxiliary sump volume 26 to bias the plate 34 to open the inlet orifice 32. Those skilled in the art of springs will understand that the bi-metallic spring member 38 is a laminate of at least two metals having differing thermal expansion coefficients and as such, has a variable spring rate characteristic in response to varying temperatures. The volume of fluid 16 will tend to increase with increasing temperature and aeration. Therefore, if the additional volume of fluid 16 is not stored within the auxiliary sump volume 26, the level of the fluid 16 within the main sump volume 14 may contact moving parts within the transmission 10, such as a drive link assembly (not shown). This contact may lead to decreased transmission efficiency as well as increased aeration of the fluid 16. The auxiliary sump volume 26 should be configured such that the additional volume of fluid 16 can be accommodated. Additionally, the material of the bi-metallic spring member 38 should be chosen such that the level of fluid 16 within the main sump volume 14 is maintained at a substantially constant level irrespective of the temperature of the fluid 16.

The thermal valve assembly 28 includes a first pin 40 and a second pin 42 that operate to position the thermal valve assembly 28 with respect to the case 12. The first and second pin 40 and 42 are preferably generally cylindrical in shape and are received within bores, not shown, sufficiently configured within the case to allow a slight interference fit to ensure that the thermal valve assembly 28 does not become dislodged during the assembly process of the transmission 10. Additionally, the first pin 40 is larger in diameter than the second pin 42 to provide a measure of error proofing such that the thermal valve assembly 28 cannot be installed inverted with respect to the auxiliary sump volume 26. A compliant member, such as a spring 44, is mounted with respect the thermal valve assembly 28 at an end opposite the first and second pins 40 and 42. The spring 44 cooperates with the side cover member 24 to bias the thermal valve assembly 28 against the case 12. By employing the spring 44, the need for fasteners, such as bolts or studs, are not required to retain the thermal valve assembly 28 with respect to the case 12, and therefore the transmission 10 may be more cost effective to manufacture.

Figure 2:
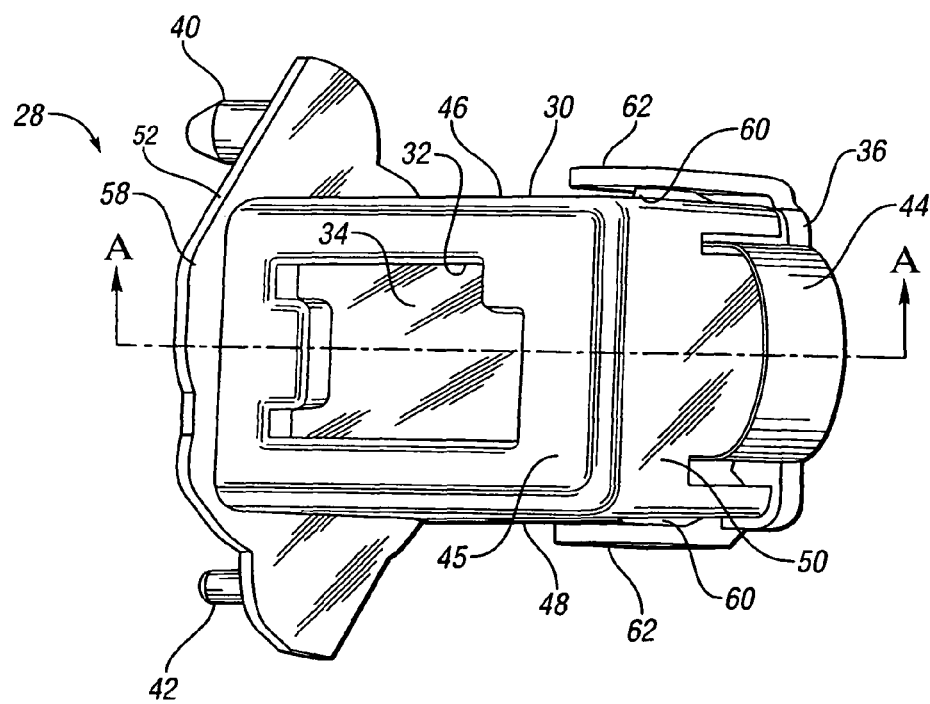
FIG. 2 is a perspective view of the thermal valve assembly show in FIG. 1.

Referring to FIG. 2, and with continued reference to FIG. 1, there is shown a perspective view of the thermal valve assembly 28 of FIG. 1. The body 30 includes a generally rectangular base portion 45 having a first and second opposed sidewalls 46 and 48, respectively, extending therefrom. The base portion 45 further includes a first and second opposed sidewalls 50 and 52, respectively, extending therefrom. The sidewalls 46, 48, and 50 are capped or closed by the cover 36 to form a volume 54, shown in FIGS. 3 and 4. The sidewall 52 at least partially defines an outlet orifice 56, shown in FIGS. 2 and 3, operable to communicate fluid 16 from within the volume 54 to the main sump volume 14. Additionally, the sidewall 52 includes a flange portion 58 extending therefrom. The flange portion 58 supports the first and second pins 40 and 42. The sidewalls 46 and 48 each have an outwardly extending tab member 60 operable to engage a respective compliant member 62 formed integrally with, and extending from the cover 36. The tab members 60 and compliant members 62 cooperate to enable a snap fit engagement between the body 30 and the cover 36. Alternately, if servicing of the thermal valve assembly 28 is not desired, the cover 36 may be permanently affixed to the body 30 by welding or bonding using adhesives known in the art.

Figure 3:
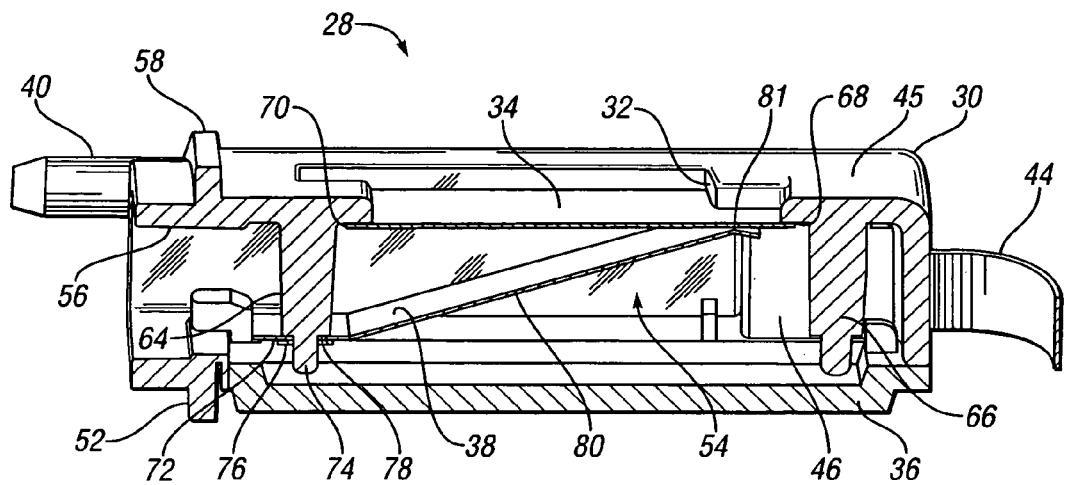
FIG. 3 is a cross sectional side view of the thermal valve assembly, taken along line A-A of FIG. 2, showing the thermal valve assembly in a closed state.

With reference to FIG. 3, there is shown a cross sectional side view of the thermal valve assembly 28 taken along line A-A of FIG. 2 and illustrating the internal configuration of the thermal valve assembly 28 in a closed state. A first and second post member 64 and 66, respectively, are preferably formed integrally with the body 30. The first and second post members 64 and 66 extend generally perpendicular from the body 30 toward the cover 36. The plate 34 defines a hole 68 sufficiently configured to loosely receive the second post member 66 therethrough. Additionally, the plate 34 defines a slot 70 formed at an end opposite the hole 68 and sufficiently configured to at least partially receive the first post member 64 therein. The slot 70 and the first post member 64 operate as a guide for the plate 34. The plate 34 is adapted to move or slide against the first post member 64, while pivoting against the second post member 66. The plate 34 is adapted to selectively abut the base portion 45, thereby substantially sealing the inlet orifice 32.

As discussed hereinabove, the bi-metallic spring member 38 operates to bias the plate 34 against the base portion 45 of the body 30. The bi-metallic spring member 38 includes a mounting portion 72 sufficiently configured to mount the bi-metallic spring member 38 to the first post member 64. In the preferred embodiment, a reduced diameter portion 74 of the first post member 64 is sufficiently configured to receive the mounting portion, while a fastening member 76 is adapted to retain the mounting portion 72 in abutment with a shoulder portion 78 of the first post member. Extending from the mounting portion 72 is a span portion 80. The span portion 80 extends generally diagonally through the volume 54 and into engagement with the plate 34. The span portion 80 has a radius portion 81 formed thereon at the point where the span portion 80 engages the plate 34 to provide a bearing surface upon which the plate 34 may slide during operation of the thermal valve assembly 28. Those skilled in the art will recognize that other forms or shapes for the bi-metallic spring member 38 may be used within the thermal valve assembly 28, such as a curved cantilever design and a simple beam design.

Figure 4:
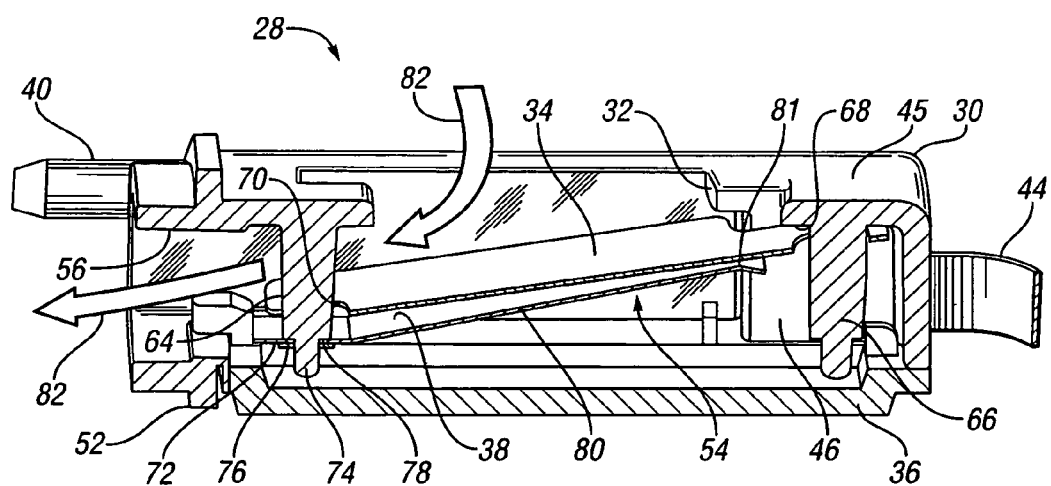
FIG. 4 is a cross sectional side view of the thermal valve assembly, taken along line A-A of FIG. 2, showing the thermal valve assembly in an open state.

With reference to FIG. 4, there is shown a cross sectional side view of the thermal valve assembly 28 taken along line A-A of FIG. 2 and illustrating the internal configuration of the thermal valve assembly 28 in an open state. As discussed hereinabove, as the bi-metallic spring member 38 warms in response to increases in fluid temperature, the spring stiffness decreases allowing the fluid 16, shown in FIG. 1, to bias the plate 34 away from the base portion 45 of the body 30. The plate 34 will pivot about the second post member 66 and slide along the first post member 64. This allows fluid 16 to flow from the auxiliary sump volume 26 through the inlet orifice 32, volume 54, and outlet orifice 56 into the main sump volume 14. By configuring the inlet orifice 32 and the outlet orifice 56 at a substantially right angle to each other, the fluid 16 may flow substantially unobstructed from the auxiliary sump volume 26 to the main sump volume 14 via flow path 82.

While the best modes for carrying out the invention have been described in detail, those familiar with the art to which this invention relates will recognize various alternative designs and embodiments for practicing the invention within the scope of the appended claims.

The invention claimed is:

1. A thermal valve assembly for a transmission, the thermal valve assembly comprising:
    a body having a base portion with a plurality of opposing sidewalls extending therefrom;
    a cover mounted with respect to said body and operable to at least partially close said body to form a volume;
    an inlet orifice defined by said base portion;
    an outlet orifice defined at least partially by at least one of said plurality of opposing sidewalls;
    a plate operable to selectively close said inlet orifice;
    a first post member fixed to and extending from said base portion and at least partially within said volume;
    a second post member fixed to and extending from said base portion and at least partially within said volume, the second post member being spaced from the first post member;
    wherein the plate is configured to slide along the first post member while the plate is pivoted about the second post member; wherein the first post member and the second post member remain fixed to said base portion without movement relative to said base portion as the plate slides along the first post member and pivots about the second post member;
    a first spring member disposed at least partially within said volume, said first spring member being operable to bias said plate against said base portion; and
    wherein said first spring member has a variable stiffness characteristic responsive to temperature.

2. The thermal valve assembly of claim 1, further comprising:
    a flange portion at least partially defined by one of said plurality of opposing sidewalls;
    a first pin and a second pin extending from said flange portion; and
    wherein said first and second pins are sufficiently configured for attachment to a case of the transmission.

3. The thermal valve assembly of claim 2, wherein said first pin and said second pin are generally cylindrical in shape and wherein said first pin is larger in diameter than said second pin.

4. The thermal valve assembly of claim 1, wherein said cover is mounted to said body by one of welding, adhesive bonding, and snap fit.

5. The thermal valve assembly of claim 1, wherein the thermal valve assembly is mounted within an auxiliary sump volume of the transmission and wherein the thermal valve assembly is configured to selectively communicate fluid from the auxiliary sump volume to a main sump volume.

6. The thermal valve assembly of claim 1,
    wherein said first post member is configured to retain said first spring member with respect to said body; and
    wherein said plate defines a slot sufficiently configured for said sliding engagement of said first post member.

7. The thermal valve assembly of claim 6, wherein said plate defines a hole generally opposite said slot, said hole being configured to loosely receive said second post member for said pivoting of said plate.

8. The thermal valve assembly of claim 1, further comprising:
    a second spring member mounted with respect to the thermal valve assembly; and
    wherein said second spring member cooperates with a side cover member of the transmission to retain the thermal valve assembly with respect to the transmission.

9. A thermal valve assembly mountable within an auxiliary sump volume of a transmission, the thermal valve assembly comprising:
    a body having a base portion with a plurality of opposing sidewalls extending therefrom;
    a cover mounted with respect to said body and operable to at least partially close said body to form a volume;
    an inlet orifice defined by said base portion;
    an outlet orifice defined at least partially by at least one of said plurality of opposing sidewalls;
    a plate operable to selectively close said inlet orifice; said outlet orifice being in fluid communication with said inlet orifice when said plate does not close said inlet orifice and not being in fluid communication with said inlet orifice when said plate closes said inlet orifice;
    a bi-metallic spring member disposed at least partially within said volume, said bi-metallic spring member being operable to bias said plate against said base portion;
    a first post member fixed to and extending from said base portion and at least partially within said volume;
    a second post member fixed to and extending from said base portion and at least partially within said volume, the second post member being spaced from the first post member;
    wherein the plate is configured to slide along the first post member while the plate is pivoted about the second post member; wherein the first post member and the second post member remain fixed to said base portion without movement relative to said base portion as the plate slides along the first post member and pivots about the second post member;
    wherein said first post member is configured to retain said bi-metallic spring member with respect to said body;
    wherein said plate defines a slot sufficiently configured for said sliding engagement of said first post member; and
    wherein said bi-metallic spring member has a variable stiffness characteristic responsive to temperature.

10. The thermal valve assembly of claim 9, wherein said plate defines a hole generally opposite said slot, said hole being configured to loosely receive said second post member for said pivoting of said plate.

11. The thermal valve assembly of claim 9, further comprising:
    a flange portion at least partially defined by one of said plurality of opposing sidewalls;
    a first pin and a second pin extending from said flange portion; and wherein said first and second pins are sufficiently configured for attachment to a case of the transmission.

12. The thermal valve assembly of claim 9, wherein said first pin and said second pin are generally cylindrical in shape and wherein said first pin is larger in diameter than said second pin.

13. The thermal valve assembly of claim 9, further comprising:
   a second spring member mounted with respect to the thermal valve assembly; and
   wherein said second spring member cooperates with a side cover member of the transmission to retain the thermal valve assembly with respect to the transmission.

14. The thermal valve assembly of claim 1, wherein the inlet orifice and the outlet orifice are at a substantially right angle to each other.

15. The thermal valve assembly of claim 1, wherein the first spring member is bi-metallic.

16. The thermal valve assembly of claim 9, wherein the inlet orifice and the outlet orifice are at a substantially right angle to each other.

17. A thermal valve assembly for a transmission, the thermal valve assembly comprising:
   a body having a base portion with a plurality of opposing sidewalls extending therefrom;
   a cover mounted with respect to said body and operable to at least partially close said body to form a volume;
   an inlet orifice defined by said base portion;
   an outlet orifice defined at least partially by at least one of said plurality of opposing sidewalls, the outlet orifice and the inlet orifice being at a substantially right angle to each other;
   a plate operable to selectively close said inlet orifice; said outlet orifice being in fluid communication with said inlet orifice when said plate does not close said inlet orifice and not being in fluid communication with said inlet orifice when said plate closes said inlet orifice;
   a thermally responsive spring member disposed at least partially within said volume, said thermally responsive spring member being operable to bias said plate against said base portion; and
   wherein said thermally responsive spring member has a variable stiffness characteristic responsive to temperature.

18. The thermal valve assembly of claim 17, wherein the thermal valve assembly is mounted within an auxiliary sump volume of the transmission and wherein the thermal valve assembly is configured to selectively communicate fluid from the auxiliary sump volume to a main sump volume.

* * * * *